(12) United States Patent
Hagiwara

(10) Patent No.: US 9,250,425 B2
(45) Date of Patent: Feb. 2, 2016

(54) ZOOM LENS AND ELECTRONIC DEVICE INCLUDING THE SAME

(71) Applicant: SAMSUNG ELECTRONICS CO., LTD., Suwon-si, Gyeonggi-do (KR)

(72) Inventor: Hiroyuki Hagiwara, Yokohama (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 137 days.

(21) Appl. No.: 14/077,681

(22) Filed: Nov. 12, 2013

(65) Prior Publication Data

US 2014/0152887 A1    Jun. 5, 2014

(30) Foreign Application Priority Data

Dec. 4, 2012   (JP) .................................. 2012-265560
Jun. 10, 2013  (KR) ......................... 10-2013-0066061

(51) Int. Cl.
*G02B 27/64*   (2006.01)
*G02B 15/14*   (2006.01)
*G02B 15/167*  (2006.01)
(Continued)

(52) U.S. Cl.
CPC ............ *G02B 15/167* (2013.01); *G02B 15/177* (2013.01); *G02B 15/22* (2013.01); *G02B 27/646* (2013.01)

(58) Field of Classification Search
CPC ............ G02B 9/00; G02B 9/34; G02B 13/00; G02B 13/001; G02B 13/0015; G02B 13/002; G02B 13/0045; G02B 15/00; G02B 15/10; G02B 15/14; G02B 15/15; G02B 15/16; G02B 15/163; G02B 15/167; G02B 15/177; G02B 15/20; G02B 15/22; G02B 15/24
See application file for complete search history.

(56) References Cited

U.S. PATENT DOCUMENTS 5,627,682 A  *  5/1997  Nagaoka .................. 359/688
5,835,272 A  *  11/1998 Kodama ................... 359/557
5,999,329 A  *  12/1999 Ohtake .................... 359/686

(Continued)

FOREIGN PATENT DOCUMENTS

EP   2 309 300 A1    4/2011
JP   11-305120 A    11/1999

(Continued)

OTHER PUBLICATIONS

Extended European Search Report issued for EP 13192590.1 (Feb. 26, 2014).

*Primary Examiner* — Thong Nguyen
(74) *Attorney, Agent, or Firm* — Drinker Biddle & Reath LLP

(57) ABSTRACT

A zoom lens includes, sequentially from an object side, a first lens group having negative refractive power, a second lens group having positive refractive power, a third lens group having negative refractive power; and a fourth lens group having positive refractive power. When zoom is varied from a wide-angle end to a telephoto end, positions of the first lens group and the fourth lens group are fixed on an optical axis. The second lens group includes, sequentially from the object side, a second A lens group having positive refractive power and a second B lens group having positive refractive power, and the second B lens group is moved in the optical axis direction to perform a focusing function from an object disposed in a close range to an object disposed at infinity. The third lens group is shifted in a direction perpendicular to the optical axis to correct image blur.

19 Claims, 10 Drawing Sheets

(51) Int. Cl.
*G02B 15/22* (2006.01)
*G02B 15/177* (2006.01)

(56) References Cited

U.S. PATENT DOCUMENTS

| | | | |
|---|---|---|---|
| 6,147,810 A * | 11/2000 | Misaka | 359/684 |
| 8,320,052 B2 | 11/2012 | Kon | |
| 2009/0002841 A1* | 1/2009 | Yamamoto et al. | 359/684 |
| 2009/0034093 A1* | 2/2009 | Katakura | 359/689 |
| 2010/0238560 A1* | 9/2010 | Fujimoto | 359/682 |
| 2011/0228160 A1* | 9/2011 | Imaoka et al. | 348/345 |
| 2012/0019931 A1 | 1/2012 | Ogata et al. | |
| 2012/0050602 A1 | 3/2012 | Imaoka et al. | |
| 2012/0176529 A1* | 7/2012 | Matsuo et al. | 348/345 |

FOREIGN PATENT DOCUMENTS

| | | |
|---|---|---|
| JP | 2011-237737 A | 11/2011 |
| JP | 2012-027262 A | 2/2012 |
| JP | 2012-047813 A | 3/2012 |

* cited by examiner

ZOOM LENS AND ELECTRONIC DEVICE INCLUDING THE SAME

CROSS-REFERENCE TO RELATED PATENT APPLICATIONS

This application claims the priority benefit of Japanese Patent Application No. 2012-0265560, filed on Dec. 4, 2012, in the Japanese Patent Office and Korean Patent Application No. 10-2013-0066061, filed on Jun. 10, 2013, in the Korean Intellectual Property Office, the disclosures of which are incorporated herein in their entirety by reference.

BACKGROUND

1. Field

One or more embodiments of the invention relate to a zoom lens and an electronic device including the same, and more particularly, to a zoom lens having a function to correct blur in a captured image due to vibration. More particularly, various embodiments of the invention relate to a zoom lens that includes four lens groups (i.e., a first lens group to a fourth lens group), where positions of the first and fourth lens groups are fixed when zoom is varied, and an electronic device including the zoom lens.

2. Description of the Related Art

Japanese Patent Publication No. 2012-047813, Japanese Patent Publication No. 2011-237737, and Japanese Patent Publication No. 2012-027262 disclose a zoom lens that includes a negative lens group (a first lens group), a positive lens group (a second lens group), a negative lens group (a third lens group), and a positive lens group (a fourth lens group) in this order from an object side and in which positions of the first lens group and the fourth lens group are fixed when zoom is varied.

In addition, in the above configuration, a zoom lens that corrects vibration through a lens shift method is known (Japanese Patent Publication No. 2012-047813). For example, in Japanese Patent Publication No. 2012-047813, an image side lens group in a second lens group is set as a vibration correcting group, and a third lens group is set as a focus group. In Japanese Patent Publication No. 2012-047813, both an inner focusing and a blur correction are realized by employing the above configuration. However, in Japanese Patent Publication No. 2012-047813, a second lens group and a third lens group are positioned too far away from each other at a telephoto end.

Here, when a zoom lens is actually manufactured as a product, it may be considered that a first lens group and a fourth lens group have fixed positions, and a second lens group and a third lens group, which need to be movable, are configured as one unit. A voice coil motor (VCM) is inserted into a unit including the second lens group and the third lens group, and a focusing operation is performed at a high speed by using the VCM. However, in a configuration of Japanese Patent Publication No. 2012-047813, since the second lens group and the third lens group are positioned too far away from each other at the telephoto end, as described above, a configuration in which the VCM is inserted into the unit including the second lens group and the third lens group may not be employed.

In addition, in Japanese Patent Publication No. 2012-047813, a fourth lens group includes one lens, but it is not likely to ensure a performance of the zoom lens if a final lens group (lens group closest to the image side) is made up of only one lens.

Furthermore, in Japanese Patent Publication No. 2011-237737 and Japanese Patent Publication No. 2012-027262, the inner focusing is realized by setting the third lens group to be a focus group, but there is no group having a function to correct vibration.

SUMMARY

One or more embodiments include a zoom lens having a function to correct blur in a captured image due to vibration, and an imaging device including the zoom lens.

Additional features will be set forth in part in the description which follows and, in part, will become apparent from the description, or may be learned by practice of the presented embodiments.

According to one or more embodiments, a zoom lens includes, sequentially from an object side, a first lens group having a negative refractive power, a second lens group having a positive refractive power, a third lens group having a negative refractive power, and a fourth lens group having a positive refractive power. When zoom is varied from a wide angle end to a telephoto end, positions the first lens group and the fourth lens group are fixed with respect to an optical axis. The second lens group includes, sequentially from the object side, a second A lens group having a positive refractive power and a second B lens group having a positive refractive power, and the second B lens group is moved in an optical axis direction to perform a focusing function from an object that is disposed in a close range to an object that is disposed at infinity. The third lens group is shifted in a direction perpendicular to the optical axis to correct image blur.

In an embodiment, the first lens group may include, sequentially from the object side, two negative lenses, each negative lens having a convex surface facing the object side, and a positive lens having a convex surface facing the object side. The zoom lens may satisfy the following condition:

$$0.3<|f1/ft|<1.0,$$

where "f1" denotes a focal length of the first lens group, and "ft" denotes a focal length of the zoom lens at the telephoto end.

The zoom lens may further satisfy the following condition:

$$0.5<|f1/ft|<0.8.$$

The second A lens group may include at least one aspherical surface, at least one positive lens, and at least one negative lens. The second B lens group may include, sequentially from the object side, a negative lens and a positive lens. The zoom lens may satisfy the following conditions:

$$0.3<f2B/ft<1.0, \text{ and}$$

$$0.3<f2A/ft<1.2,$$

where "f2A" denotes a focal length of the second A lens group, which has a positive refractive power and is disposed on the object side in the second lens group, "f2B" denotes a focal length of the second B lens group, which has a positive refractive power and is disposed on an image side in the second lens group, and "ft" denotes a focal length of the zoom lens at the telephoto end.

The zoom lens may further satisfy the following conditions:

$$0.5<f2B/ft<0.8, \text{ and}$$

$$0.5<f2A/ft<0.9.$$

In another embodiment, the second A lens group may include a positive lens having a convex surface facing the object side, and a negative lens having a concave surface facing the image side.

In yet another embodiment, the negative lens and the positive lens of the second B lens group may be bonded to each other to form a cemented lens.

In still another embodiment, the third lens group may include, sequentially from the object side, at least one positive lens and at least one negative lens. The zoom lens may satisfy the following condition:

$$0.3<|f3/ft|<1.2,$$

where "f3" denotes a focal length of the third lens group, and "ft" denotes a focal length of the zoom lens at the telephoto end.

The zoom lens may further satisfy the following condition:

$$0.5<|f3/ft|<0.9.$$

In an embodiment, the at least one negative lens and the at least one positive lens of the third lens group may be bonded to each other to form a cemented lens.

In another embodiment, the positive lens of the third lens group be a meniscus lens having a concave shape toward the object side.

In yet another embodiment, the fourth lens group may include, sequentially from the object side, a positive lens and a negative lens. The zoom lens may satisfy the following condition:

$$1.5<f4/ft,$$

where "f4" denotes a focal length of the fourth lens group, and "ft" denotes a focal length of the zoom lens at the telephoto end.

The zoom lens may further satisfy the following condition:

$$1.7<f4/ft<15.$$

In still another embodiment, the negative lens and the positive lens of the fourth lens group may be bonded to each other to form a cemented lens.

When zoom is varied from the wide angle end to the telephoto end, the second lens group and the third lens group may be moved in the optical axis direction to change an interval between the first lens group and the second A lens group, an interval between the second A lens group and the second B lens group, an interval between the second B lens group and the third lens group, and an interval between the third lens group and the fourth lens group.

According to one or more embodiments, an electronic device includes the zoom lens, and an imaging element converts an optical image signal transmitted by the zoom lens into an electrical image signal.

According to one or more embodiments, a camera includes a housing, the zoom lens that is configured as an interchangeable lens and is configured to detachably couple to the housing, and an imaging element that is disposed within the housing and converts an optical image signal transmitted by the zoom lens into an electrical image signal.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
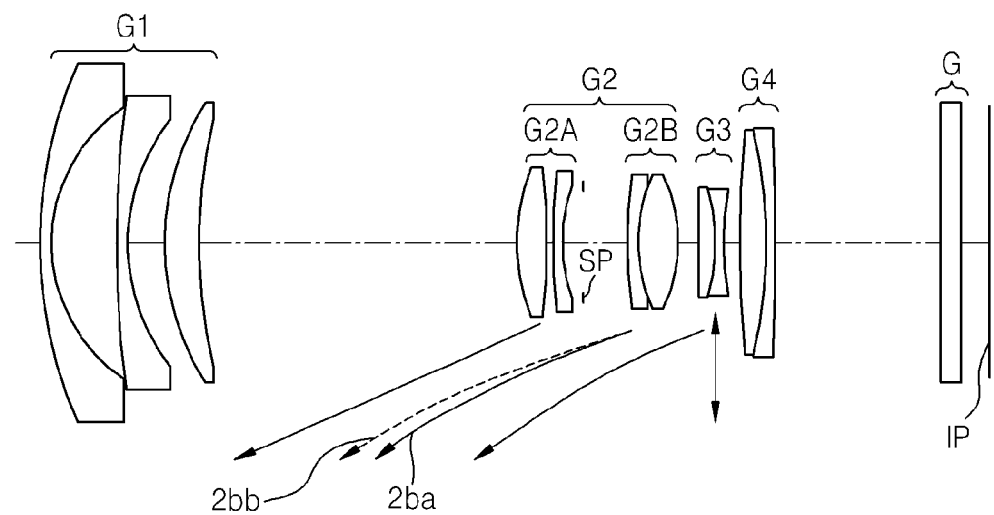
FIG. 1 is a cross-sectional view of a zoom lens at a wide angle end, according to a first exemplary embodiment.

Hereinafter, exemplary embodiments of the invention will be described in detail with reference to the attached drawings. The same reference numerals in the drawings denote the same element. In the drawings, the thicknesses of layers and regions are exaggerated for clarity. Expressions such as "at least one of," when preceding a list of elements, modify the entire list of elements and do not modify the individual elements of the list.

FIG. 1 is a diagram showing a zoom lens, according to an exemplary embodiment. The zoom lens according to the current embodiment may include, in a sequence from an object side, a first lens group G1 having a negative refractive power, a second lens group G2 having a positive refractive power, a third lens group G3 having a negative refractive power, and a fourth lens group G4 having a positive refractive power. Here, G refers to an optical element that may include an optical filter, a faceplate, a protection glass or plate, or the like. An IP refers to an image plane, and may correspond to an imaging surface of a solid imaging element (photoelectric conversion device) such as a charge-coupled device (CCD) sensor or a complementary metal-oxide semiconductor (CMOS) sensor when the zoom lens according to the current embodiment is used as a photographing optical system of an interchangeable lens system camera, a monitoring camera, a video camera, a digital camera, or other electronic devices with photographing and imaging capturing capabilities. In addition, when the zoom lens is used for an optical system of a camera or electronic device that uses a silver halide film, the image plane IP may correspond to a film surface.

When zoom is varied from a wide angle end to a telephoto end, the second lens group G2 and the third lens group G3 may move in a direction along an optical axis so that all intervals between the lens groups (i.e., an interval between the first lens group G1 and a second A lens group G2A, an interval between the second A lens group G2A and a second B lens group G2B, an interval between the second B lens group G2B and the third lens group G3, and an interval between the third lens group G3 and the fourth lens group G4) vary, as shown by the arrows in FIG. 1. At this time, the first lens group G1 and the fourth lens group G4 are moved to fixed positions on the optical axis. An aperture stop SP may be disposed between the second A lens group G2A and the second B lens group G2B.

In addition, an inner focusing may be realized by configuring an image side lens group (e.g., the second B lens group G2B) of the second lens group G2 to have a focusing function, and an image may be shifted by shifting the third lens group G3 in a direction perpendicular to the optical axis.

Furthermore, according to the current embodiment, an excellent vibration correction and an inner focusing may be realized, and the lens groups may be designed as described below in order to manufacture a small and lightweight zoom lens.

First, the first lens group G1 includes, in a sequence from the object side, two negative lenses having a convex surface facing the object side, and a positive lens having a convex surface facing the object side. The first lens group G1 has at least one aspherical surface. The first lens group G1 has a negative refractive power, and particularly, the correction of an off-axis aberration at a wide angle position may be easily performed by disposing, in a sequence from the object side, two negative lenses having the convex surface facing the object side. In addition, the correction of the off-axis aberration at a wide angle position may be satisfactorily performed by the first lens group G1 having at least one aspherical surface. For example, a lens including an aspherical surface may be installed at the position of a second negative lens from the object side in the first lens group G1. In this case, the lens having the aspherical surface may be reduced in size. In addition, in the first lens group G1, the correction of chromatic aberration occurring in the first lens group G1 or the correction of spherical aberration at a telephoto position may be easily performed by disposing the positive lens having the convex surface facing the object side.

The first lens group G1 may be configured so as to satisfy the following condition.

$$0.3 < |f1/ft| < 1.0 \qquad \text{(condition 1)}$$

Here, "ft" denotes a focal length of the whole zoom lens system at the telephoto end thereof, and "f1" denotes a focal length of the first lens group G1. The above condition 1 defines a relationship between the focal length f1 of the first lens group G1 and the focal length ft of the whole zoom lens system at the telephoto end. If |f1/ft| exceeds the upper limit of condition 1 and thus the refraction of the first lens group G1 is decreased, which is not preferable, the diameter and the thickness of the lens of the first lens group G1 may be increased, which may result in an increase in the size of the zoom lens. When |f1/ft| is less than the lower limit of condition 1 and thus the refraction of the first lens group G1 is increased, which is not preferable, because all aberration may not be corrected and thus a high performance cannot be achieved.

More preferably, a numerical range of condition 1 may be established as follows.

$$0.5 < |f1/ft| < 0.8 \qquad \text{(condition 1 a)}$$

The second lens group G2 may include, in a sequence from the object side, the second A lens group G2A having a positive refractive power and the second B lens group G2B having a positive refractive power. The second A lens group G2A may include a positive lens having a convex surface facing the object side and a negative lens having a concave surface facing the image side. In addition, the second A lens group G2A includes at least one aspherical surface. A variation in an off-axis aberration that occurs when zoom is varied may be satisfactorily corrected by the second A lens group G2A having at least one aspherical surface. Furthermore, chromatic aberration may be satisfactorily corrected by the second A lens group G2A including the positive lens and the negative lens. The off-axis aberration that occurs when zoom is varied may be satisfactorily corrected by configuring a negative lens group as the negative lens having a convex surface facing the object side in the second A lens group G2A.

The second B lens group G2B may include a cemented lens in which a negative lens and a positive lens are bonded to each other. The second B lens group G2B includes, in a sequence from the object side, the negative lens and the positive lens, and thus a variation in chromatic aberration that occurs at the time of focusing may be satisfactorily corrected. The configuration of the second B lens group G2B may be reduced in size and simplified by configuring the second B lens group G2B as a cemented lens. The second B lens group G2B is moved toward the object at the time of focusing on an object that is disposed in a close range. A solid-line curve 2ba of the second B lens group G2B refers to a movement trajectory for correcting the image plane variation when zoom is varied from the wide angle end to the telephoto end at the time of focusing on an object at infinity. A dotted-line curve 2bb of the second B lens group G2B refers to a movement trajectory for correcting the image plane variation when zoom is varied from the wide angle end to the telephoto end at the time of focusing on an object that is disposed in a close range.

The third lens group G3 may include a cemented lens in which a positive lens and a negative lens are bonded to each other. The third lens group G3 may be configured to be shifted in a direction perpendicular to the optical axis in order to shift an image. The third lens group G3 is configured to be moved in a direction perpendicular to the optical axis, and thus the third lens group G3 may perform an excellent vibration correction function. Chromatic aberration that occurs when an image is shifted may be satisfactorily corrected by configuring the third lens group G3 to include a positive lens and a negative lens. The positive lens included in the third lens group G3 is disposed closer to the object side and is formed to have a meniscus shape so as to reduce the volume and weight of the third lens group G3, thereby reducing a load with respect to an actuator. Furthermore, the configuration of the third lens group G3 may be simplified by forming the third lens group G3 as a cemented lens.

The second lens group G2 and the third lens group G3 may be configured so as to satisfy the following conditions.

$$0.3 < f2B/ft < 1.0 \qquad \text{(condition 2)}$$

$$0.3 < f2A/ft < 1.2 \qquad \text{(condition 3)}$$

$$0.3 < |f3/ft| < 1.2 \qquad \text{(condition 4)}$$

Here, "f2A" denotes a focal length of the second A lens group G2A having a positive refractive power and disposed on the object side in the second lens group G2. "f2B" denotes a focal length of the second B lens group G2B having a positive refractive power and disposed on the image side in the second lens group G2. "f3" denotes a focal length of the third lens group G3, and "ft" denotes a focal length of the whole zoom lens system at the telephoto end.

Condition 2 defines a relationship between the focal length f2B of the second B lens group G2B having a positive refractive power and which is disposed on the image side in the second lens group G2, and the focal length ft of the whole zoom lens system at the telephoto end. Condition 2, when satisfied, allows the second B lens group G2B, which is a focusing lens group, to perform an optimized focusing function and allows the second B lens group G2B to have a focusing function from an object that is disposed in a close range to an object at infinity. If f2B/ft exceeds the upper limit of condition 2, which is not preferable, the refractive power of the second B lens group G2B, which is a focusing lens group, may be excessively decreased. Consequently, the movement of the second B lens group G2B while performing the focusing function may be increased, which may make it difficult for the zoom lens to be reduced in size. If f2B/ft is less than the lower limit of condition 2, which is not preferable, the refractive power of the second B lens group G2B, which is a focusing lens group, may be excessively increased. Thus, a variation in aberration at the time of focusing may not be satisfactorily corrected.

Condition 3 defines a relationship between the focal length f2A of the second A lens group G2A having a positive refractive power and which is disposed on the object side in the second lens group G2, and the focal length ft of the whole zoom lens system at the telephoto end. Condition 3 is a condition for ensuring the performance of and reducing a size of a focusing lens group. If f2A/ft exceeds the upper limit of condition 3, which is not preferable, the refractive power of the second A lens group G2A may be excessively decreased, and thus an ability of the second A lens group G2A to converge light on the second B lens group G2B may be deteriorated. As a result, the size of the second B lens group G2B may be increased, which may lead to an increase in the weight thereof and an increase in the size of the zoom lens and a driving device. If f2A/ft is less than the lower limit of condition 3, which is not preferable, the refractive power of the second A lens group G2A may be excessively increased, and thus a variation in aberration when zoom is varied may not be satisfactorily corrected.

Condition 4 defines a relationship between the focal length f3 of the third lens group G3 and the focal length ft of the whole zoom lens system at the telephoto end. Condition 4 is a condition which allows the third lens group G3, which is a vibration-proof group, to have an optimized vibration correction function. The third lens group G3, which is a shifting lens group, corrects image blur by being shifted when an image is shifted. If |f3/ft| exceeds the upper limit of condition 4, which is not preferable, the refractive power of the third lens group G3 may be excessively decreased, and thus an amount of shift may be increased. Accordingly, an amount of work required for driving may be increased, and thus the miniaturization of a driving function may not be achieved. If |f3/ft| is less than the lower limit of condition 4, which is not preferable, the refractive power of the third lens group G3 may be excessively increased, and thus the control of correction of image shift may become complicated and result in image blurring.

More preferably, numerical ranges of condition 2, condition 3, and condition 4 may be established as follows.

$$0.5 < f2B/ft < 0.8 \quad \text{(condition 2a)}$$

$$0.5 < f2A/ft < 0.9 \quad \text{(condition 3a)}$$

$$0.5 < |f3/ft| < 0.9 \quad \text{(condition 4a)}$$

Next, the fourth lens group G4 may be configured as a cemented lens in which a positive lens and a negative lens are bonded to each other. The fourth lens group G4, which is made up of the positive lens and the negative lens which are sequentially disposed from the object side, corrects chromatic aberration and thereby achieves a high performance. In addition, an error that may occur during assembly at the time of manufacture may be reduced by disposing a cemented lens in which a positive lens and a negative lens are bonded to each other, thereby achieving a stable optical quality.

In addition, the fourth lens group G4 may include a positive lens and a negative lens, which are sequentially disposed from the object side, so as to satisfy the following condition.

$$1.5 < f4/ft \quad \text{(condition 5)}$$

Here, "ft" denotes a focal length of the whole zoom lens system at the telephoto end, and "f4" denotes a focal length of the fourth lens group G4. If condition 5 is satisfied by a final lens group, that is, the fourth lens group, an optimal image quality may be achieved. If the refractive power of the fourth lens group G4 is increased and f4/ft is less than the lower limit of condition 5, which is not preferable, a variation in aberration may not be satisfactorily corrected when zoom is varied from the wide angle end to the telephoto end.

More preferably, a numerical range of condition 5 may be established as follows.

$$1.7 < f4/ft < 15.0 \quad \text{(condition 5a)}$$

If the refractive power of the fourth lens group G4 is decreased and f4/ft exceeds the upper limit of the relation 5a, which is not preferable, the fourth lens group G4 may have a strong gradient to light incident on an imaging element since an exit pupil may not be separated far away therefrom. This may lead to deterioration in an image quality, such as a decrease in an amount of incident light or an erroneous incidence on a color filter.

EMBODIMENTS

Embodiments 1 to 5 will be described below. Table 1 below shows the correspondence between the embodiments and the conditions (relations).

TABLE 1

| Relation | Numerical Embodiment 1 | Numerical Embodiment 2 | Numerical Embodiment 3 | Numerical Embodiment 4 | Numerical Embodiment 5 |
|---|---|---|---|---|---|
| (1) | 0.641 | 0.600 | 0.509 | 0.750 | 0.590 |
| (2) | 0.576 | 0.728 | 0.621 | 0.528 | 0.702 |
| (3) | 0.713 | 0.882 | 0.613 | 0.845 | 0.549 |
| (4) | 0.549 | 0.859 | 0.598 | 0.548 | 0.531 |
| (5) | 2.333 | 3.457 | 14.298 | 1.749 | 5.115 |

With respect to each Numerical Embodiment, a surface number i denotes an order of optical surfaces on the object side. Here, "ri" denotes a curvature radius of an i-th optical surface, "di" denotes a surface interval between an i-th surface and an i+1-th surface, and "ndi" and "vdi" respectively denote a refractive index and an Abbe number of an i-th optical member material with respect to a d line. A back focal distance BF is an air-converted value of a distance between a final lens surface and a paraxial image plane. The entire length of the zoom lens is a value obtained by adding the back focal distance BF to a distance between a foremost lens surface and the final lens surface. A unit of length is mm. In addition, when "K" denotes a conic constant, "A4", "A6", "A8", and "A10" denote aspherical coefficients, and a displacement in an optical axis direction at a height H from the optical axis is "x" based on the vertex of the surface, the shape of the aspherical surface of the lens is expressed by the following equation.

$$X = \frac{(1/R)H^2}{1+\sqrt{1-(1+K)(H/R)^2}} + A4H^4 + A6H^6 + A8H^8 + A10H^{10} \quad (1)$$

In equation (1), "R" denotes a curvature radius. In addition, for example, "E-Z" denotes "$10^{-z}$", "f" denotes a focal length, "Fno" denotes an F number, and "ω" denotes a half-angle of view (semi-angle of view). "Upper surface" denotes the image surface.

Embodiment 1

Figure 2:
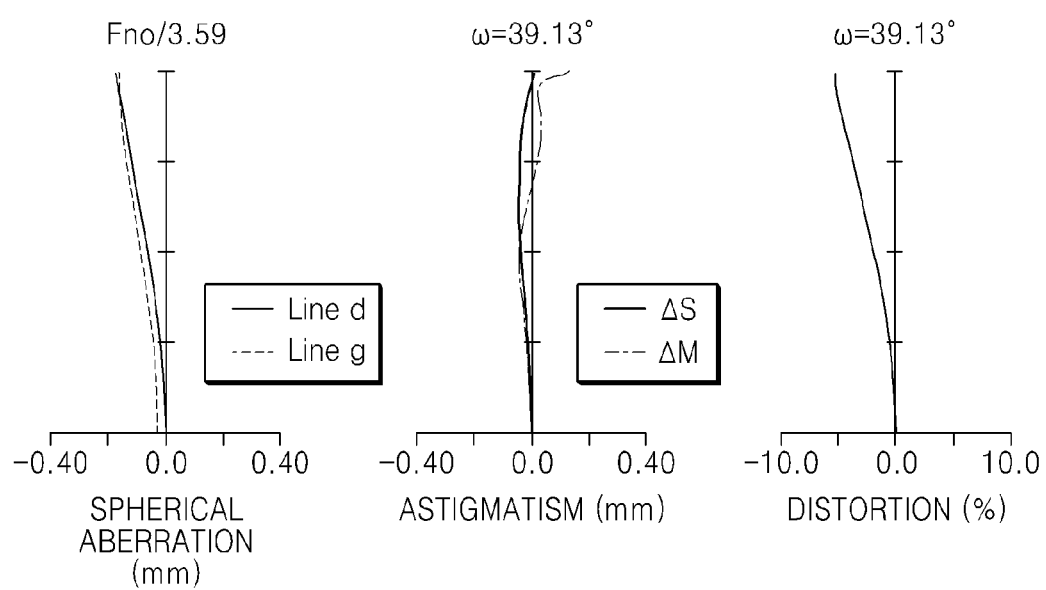
FIG. 2 is an aberration diagram of the zoom lens of FIG. 1 at the wide angle end.
Figure 3:
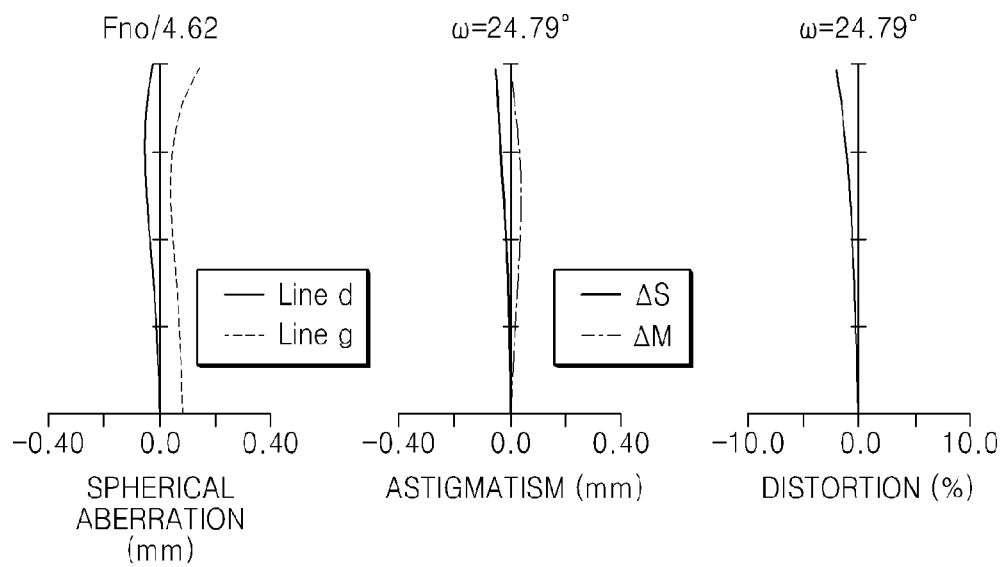
FIG. 3 is an aberration diagram of the zoom lens of FIG. 1 at an intermediate zoom position.
Figure 4:
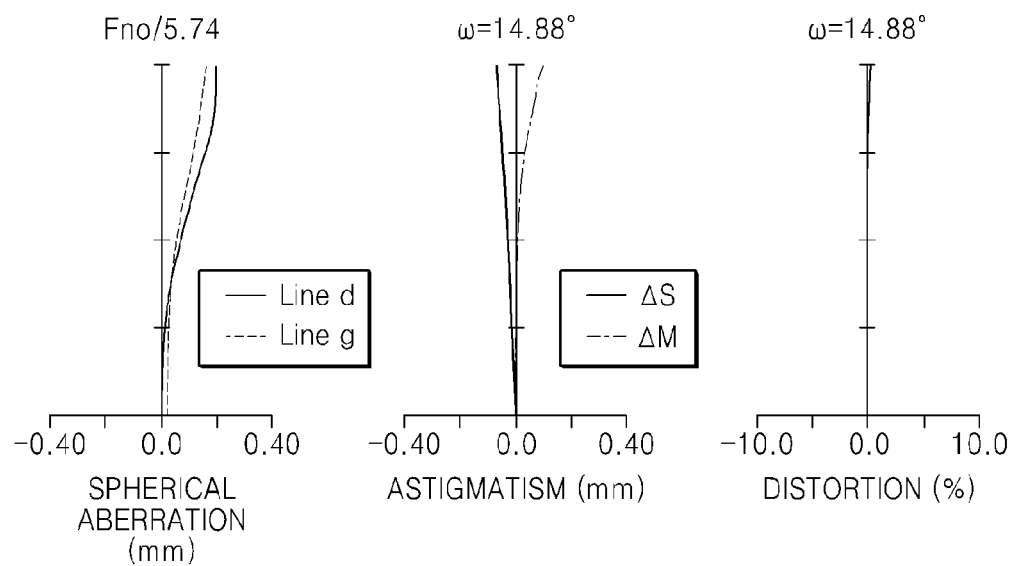
FIG. 4 is an aberration diagram of the zoom lens of FIG. 1 at a telephoto end.

Table 2 shows the lens data for Embodiment 1. In addition, FIG. 1 is a cross-sectional view of a zoom lens at a wide angle end, according to Embodiment 1. FIG. 2 is an aberration diagram of the zoom lens at the wide angle end, according to Embodiment 1. FIG. 3 is an aberration diagram of the zoom lens at an intermediate zoom position, according to Embodiment 1. FIG. 4 is an aberration diagram of the zoom lens at a telephoto end, according to Embodiment 1.

TABLE 2

[Numerical Embodiment 1]

Surface Date

| Surface No. | r | d | nd | vd |
|---|---|---|---|---|
| Object Surface | ∞ | ∞ | | |
| 1 | 46.336 | 1.200 | 1.72916 | 54.67 |
| 2 | 17.377 | 7.021 | | |
| 3* | 231.666 | 1.200 | 1.58313 | 59.00 |
| 4* | 21.665 | 4.096 | | |
| 5 | 26.995 | 3.811 | 1.80610 | 33.27 |
| 6 | 70.117 | Variable | | |
| 7* | 16.358 | 3.432 | 1.68997 | 53.00 |
| 8* | −72.661 | 0.872 | | |
| 9 | 95.614 | 0.800 | 1.67270 | 32.17 |
| 10 | 18.418 | 2.300 | | |
| 11 | ∞ | Variable | | |
| 12* | 43.117 | 1.000 | 1.68475 | 31.22 |
| 13 | 17.933 | 4.270 | 1.49700 | 81.61 |
| 14 | −17.933 | Variable | | |
| 15 | −147.518 | 1.541 | 1.84666 | 23.78 |
| 16 | −23.382 | 1.000 | 1.80611 | 40.73 |
| 17 | 27.038 | Variable | | |
| 18 | 132.937 | 2.731 | 1.72916 | 54.67 |

TABLE 2-continued

[Numerical Embodiment 1]

| | | | | |
|---|---|---|---|---|
| 19 | −53.118 | 1.000 | 1.69895 | 30.05 |
| 20 | −348.465 | 18.000 | | |
| 21 | ∞ | 2.000 | 1.51680 | 64.20 |
| 22 | ∞ | 3.200 | | |
| Upper Surface | ∞ | | | |

Aspherical Surface Data

3rd Surface

| K = 0 | A4 = 2.25E−05 | A6 = −7.58E−08 | A8 = 1.5E−10 |
|---|---|---|---|

4th Surface

| K = 0 | A4 = 1.32E−05 | A6 = −8.80E−08 | A8 = 2.65E−11 |
|---|---|---|---|

7th Surface

| K = 0 | A4 = −2.03E−05 | A6 = −2.00E−08 | A8 = 6.03E−10 |
|---|---|---|---|

8th Surface

| K = 0 | A4 = 1.51E−05 | A6 = 8.77E−08 | A8 = 8.92E−11 |
|---|---|---|---|

12th Surface

| K = 0 | A4 = −4.30E−05 | A6 = 1.51E−08 | A8 = −7.98E−10 |
|---|---|---|---|

Various Pieces of Data
Zoom Ratio 2.88

| | Wide Angle | Intermediate | Telephoto |
|---|---|---|---|
| Focal Length | 18.550 | 31.477 | 53.405 |
| F Number | 3.59 | 4.62 | 5.74 |
| Semi-Angle of View (°) | 39.13 | 24.79 | 14.88 |
| Image Height | 14.250 | 14.250 | 14.250 |
| Entire Length of Lens | 103.000 | 103.000 | 103.000 |
| BF (in air) | 22.519 | 22.519 | 22.519 |
| d6 | 34.227 | 17.643 | 1.200 |
| d11 | 4.903 | 2.328 | 3.617 |
| d14 | 2.492 | 1.501 | 4.095 |
| d17 | 1.903 | 22.052 | 34.613 |

Embodiment 2

Figure 5:
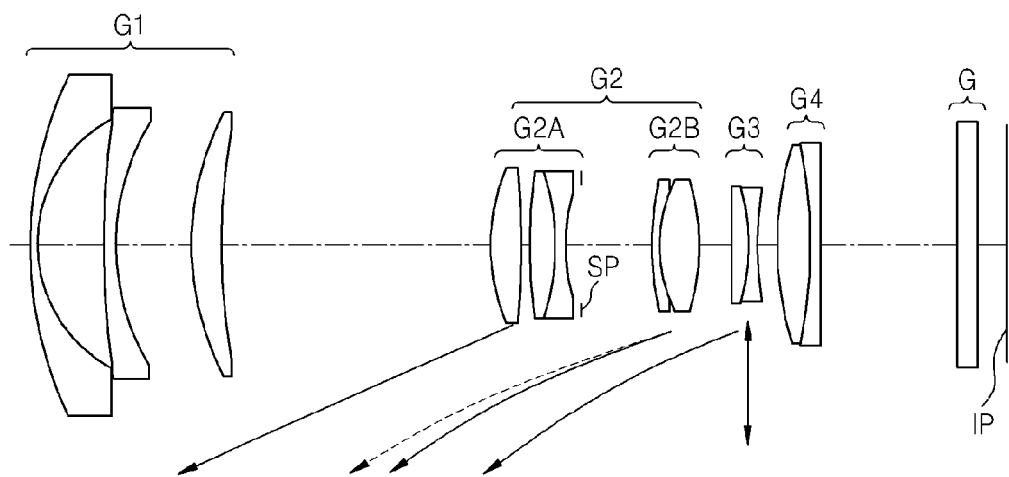
FIG. 5 is a cross-sectional view of a zoom lens at a wide angle end, according to another a second exemplary embodiment.
Figure 6:
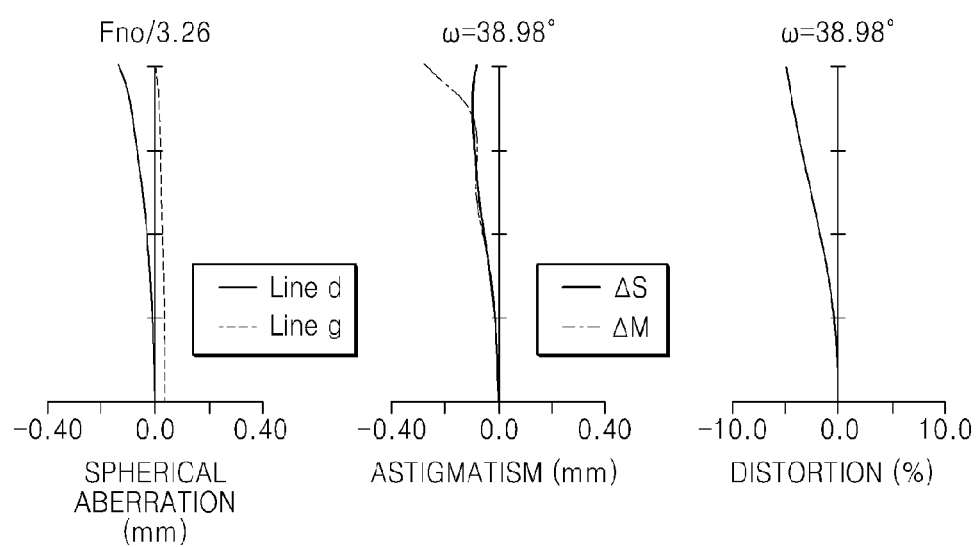
FIG. 6 is an aberration diagram of the zoom lens of FIG. 5 at the wide angle end.
Figure 7:
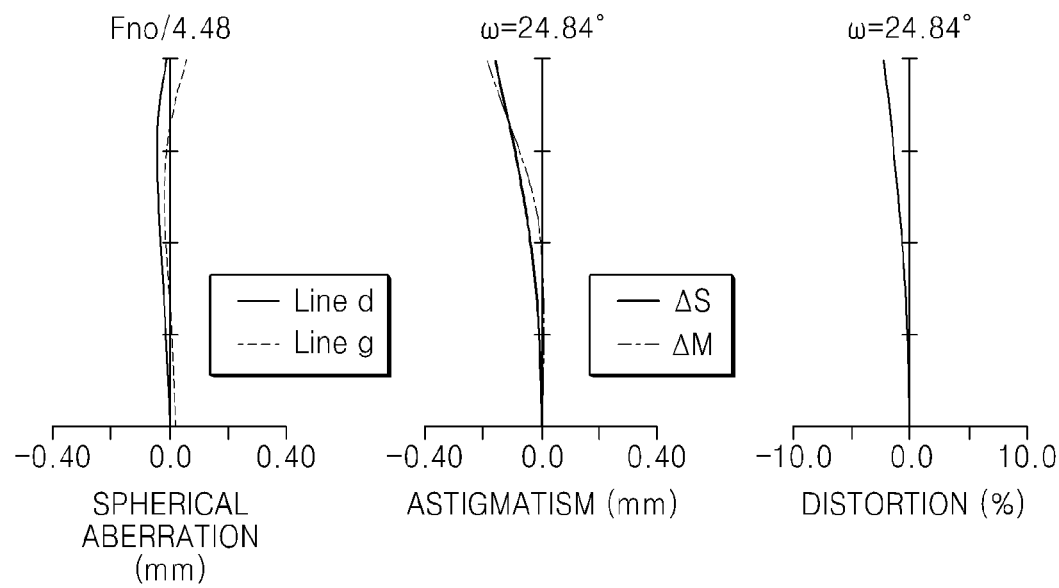
FIG. 7 is an aberration diagram of the zoom lens of FIG. 5 at an intermediate zoom position.
Figure 8:
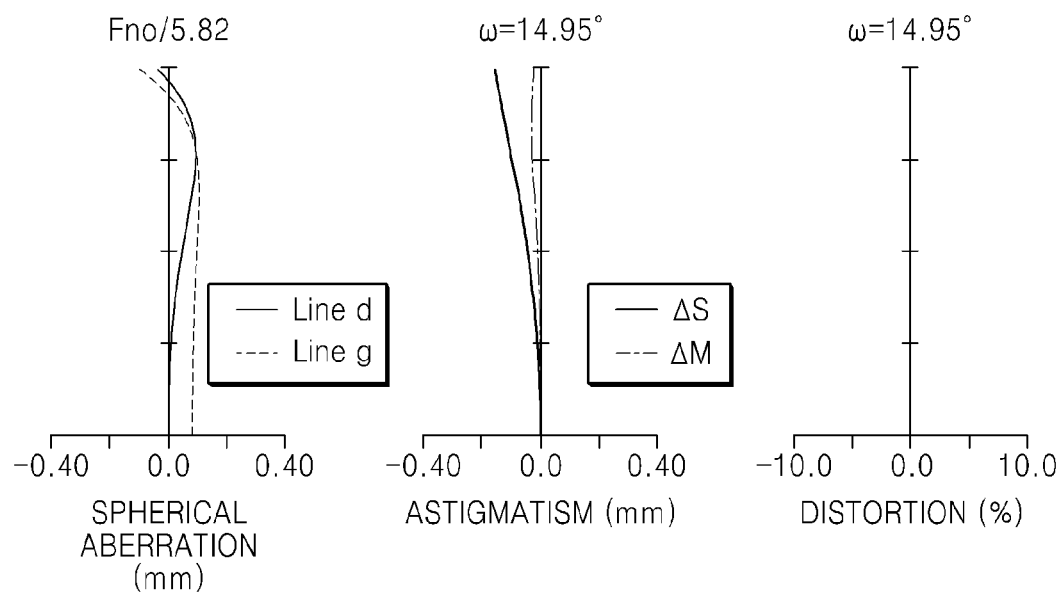
FIG. 8 is an aberration diagram of the zoom lens of FIG. 5 at a telephoto end.

Table 3 shows the lens data for Embodiment 2. In addition, FIG. 5 is a cross-sectional view of a zoom lens at a wide angle end, according to Embodiment 2. FIG. 6 is an aberration diagram of the zoom lens at the wide angle end, according to Embodiment 2. FIG. 7 is an aberration diagram of the zoom lens at an intermediate zoom position, according to Embodiment 2. FIG. 8 is an aberration diagram of the zoom lens at a telephoto end, according to Embodiment 2.

TABLE 3

[Numerical Embodiment 2]

Surface Data

| Surface No. | r | d | nd | vd |
|---|---|---|---|---|
| object Surface | ∞ | ∞ | | |
| 1 | 45.721 | 1.532 | 1.72000 | 43.69 |
| 2 | 17.365 | 7.856 | | |
| 3* | 180.645 | 1.500 | 1.69350 | 53.19 |
| 4* | 28.414 | 9.296 | | |
| 5 | 38.882 | 3.755 | 1.84666 | 23.78 |
| 6 | 81.886 | Variable | | |
| 7 | 22.886 | 3.490 | 1.72000 | 43.69 |
| 8 | −117.145 | 1.335 | | |
| 9* | 45.289 | 3.231 | 1.51633 | 64.07 |

TABLE 3-continued

[Numerical Embodiment 2]

| | | | | |
|---|---|---|---|---|
| 10 | −27.129 | 1.000 | 1.72047 | 34.71 |
| 11 | 27.129449 | 2.000 | | |
| 12 (Aperture) | ∞ | Variable | | |
| 13 | 37.748 | 0.800 | 1.69895 | 30.13 |
| 14 | 14.758 | 4.948 | 1.51633 | 64.07 |
| 15* | −25.712 | Variable | | |
| 16 | −212.454 | 1.984 | 1.84666 | 23.78 |
| 17 | −20.235 | 0.794 | 1.83400 | 37.16 |
| 18 | 45.490 | Variable | | |
| 19 | 46.084 | 4.105 | 1.48749 | 70.24 |
| 20 | −46.084 | 1.300 | 1.72047 | 34.71 |
| 21 | 3171.0942 | 18.011 | | |
| 22 | ∞ | 2.000 | 1.51680 | 64.20 |
| 23 | ∞ | 3.200 | | |
| Upper Surface | ∞ | | | |

Aspherical Surface Data

3rd Surface $K = 0$   $A4 = 2.9E{-}05$   $A6 = -8.58E{-}08$   $A8 = 9.26E{-}11$

4th Surface $K = 0$   $A4 = 2.05E{-}05$   $A6 = -9.69E{-}08$   $A8 = -2.79E{-}11$ 9th Surface $K = 0$   $A4 = -1.65E{-}05$   $A6 = -2.22E{-}08$   $A8 = 9.92E{-}11$ TABLE 3-continued

[Numerical Embodiment 2]

15th Surface $K = 0$   $A4 = 1.80E{-}05$   $A6 = -1.59E{-}09$   $A8 = 1.68E{-}10$ Various Pieces of Data
Zoom ratio 2.88

| | Wide Angle | Intermediate | Telephoto |
|---|---|---|---|
| Focal Length | 18.550 | 31.489 | 53.400 |
| F Number | 3.26 | 4.48 | 5.82 |
| Semi-Angle of View (°) | 38.98 | 24.84 | 14.95 |
| Image Height | 14.250 | 14.250 | 14.250 |
| Entire Length of Lens | 126.160 | 126.160 | 126.160 |
| BF(in air) | 22.530 | 22.530 | 22.530 |
| d6 | 39.016 | 20.557 | 2.021 |
| d12 | 8.652 | 4.283 | 5.181 |
| d15 | 4.303 | 2.000 | 7.182 |
| d18 | 2.055 | 27.186 | 39.642 |

Embodiment 3

Figure 9:
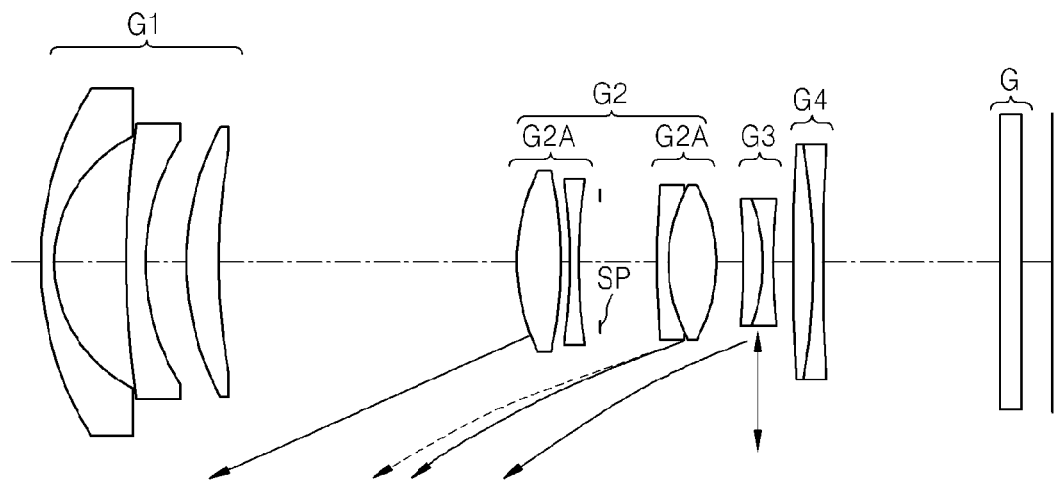
FIG. 9 is a cross-sectional view of a zoom lens at a wide angle end, according to a third exemplary embodiment.
Figure 10:
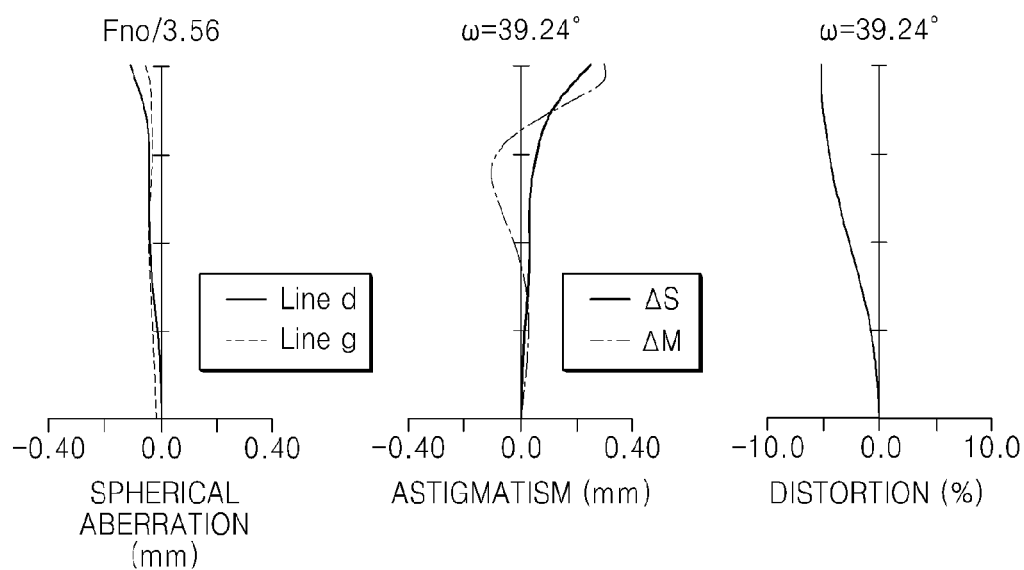
FIG. 10 is an aberration diagram of the zoom lens of FIG. 9 at the wide angle end.
Figure 11:
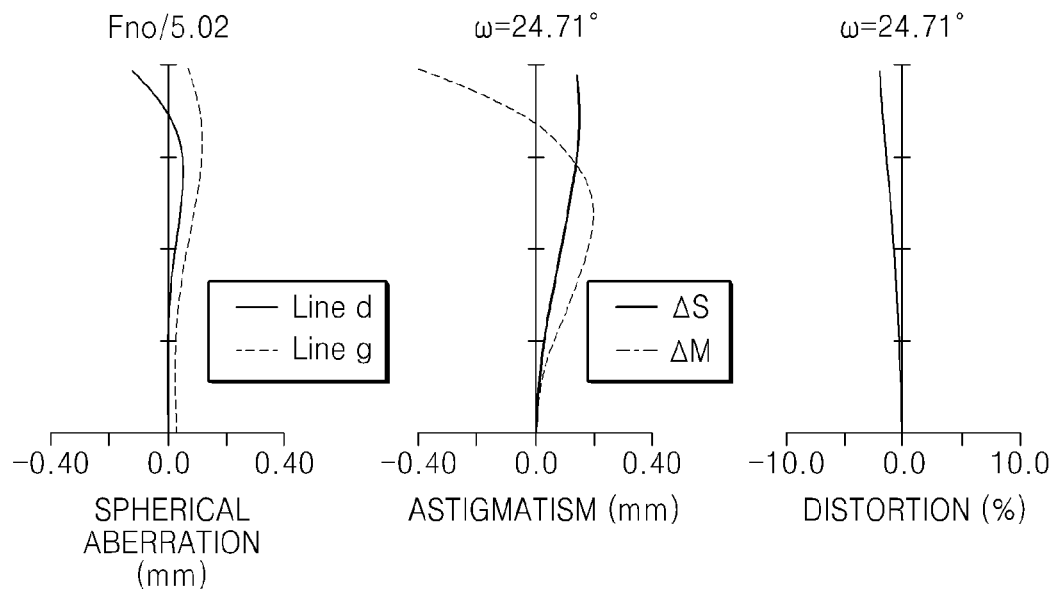
FIG. 11 is an aberration diagram of the zoom lens of FIG. 9 at an intermediate zoom position.
Figure 12:
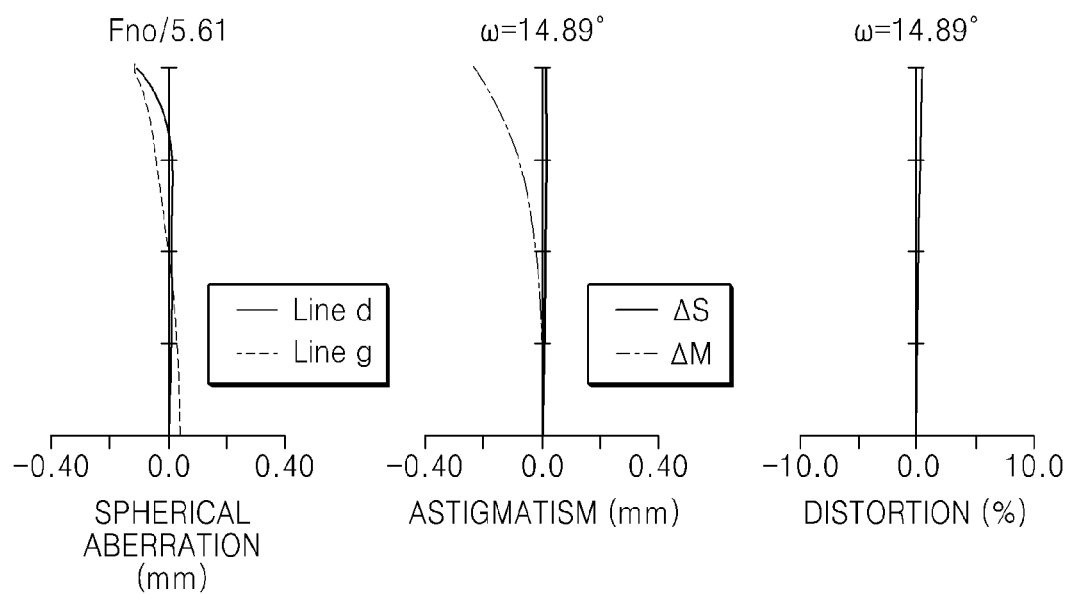
FIG. 12 is an aberration diagram of the zoom lens of FIG. 9 at a telephoto end.

Table 4 shows the lens data for Embodiment 3. FIG. 9 is a cross-sectional view of a zoom lens at a wide angle end, according to Embodiment 3. FIG. 10 is an aberration diagram of the zoom lens at the wide angle end, according to Embodiment 3. FIG. 11 is an aberration diagram of the zoom lens at an intermediate zoom position, according to Embodiment 3. FIG. 12 is an aberration diagram of the zoom lens at a telephoto end, according to Embodiment 3.

TABLE 4

[Numerical Embodiment 3]

Surface Data

| Surface No. | r | d | nd | vd |
|---|---|---|---|---|
| Object Surface | ∞ | ∞ | | |
| 1 | 31.748 | 1.200 | 1.80420 | 46.50 |
| 2 | 14.146 | 7.474 | | |
| 3* | 180.346 | 2.000 | 1.69350 | 53.19 |
| 4* | 24.205 | 4.077 | | |
| 5 | 27.348 | 3.157 | 1.80518 | 25.46 |
| 6 | 63.982 | Variable | | |
| 7* | 19.669 | 4.395 | 1.69350 | 53.19 |
| 8* | −33.231 | 0.958 | | |
| 9 | −69.583 | 0.800 | 1.67270 | 32.17 |
| 10 | 36.358 | 2.300 | | |
| 11 (Aperture) | ∞ | Variable | | |
| 12* | 59.913 | 1.046 | 1.68893 | 31.08 |
| 13 | 16.208 | 5.000 | 1.49700 | 81.61 |
| 14 | −16.208 | Variable | | |
| 15 | −103.977 | 2.005 | 1.84666 | 23.78 |
| 16 | −18.833 | 1.000 | 1.80611 | 40.73 |
| 17 | 32.211 | Variable | | |
| 18 | 304.814 | 1.924 | 1.72916 | 54.67 |
| 19 | −77.291 | 1.000 | 1.69895 | 30.05 |
| 20 | 482.819 | 18.050 | | |
| 21 | ∞ | 2.000 | 1.51680 | 64.20 |
| 22 | ∞ | 3.200 | | |
| Upper Surface | ∞ | | | |

TABLE 4-continued

[Numerical Embodiment 3]

Aspherical Surface Data

3rd Surface

| | | | | |
|---|---|---|---|---|
| K = 0 | A4 = −5.16E−05 | A6 = 9.18E−07 | A8 = −4.47E−09 | A10 = 8.52E−12 |

4th Surface

| | | | | |
|---|---|---|---|---|
| K = 0 | A4 = −6.39E−05 | A6 = 9.38E−07 | A8 = −4.32E−09 | A10 = 4.47E−12 |

7th Surface

| | | | |
|---|---|---|---|
| K = 0 | A4 = −2.14E−05 | A6 = −7.43E−08 | A8 = 1.28E−09 |

9th Surface

| | | | |
|---|---|---|---|
| K = 0 | A4 = 9.15E−06 | A6 = 5.38E−08 | A8 = 7.14E−10 |

12th Surface

| | | | |
|---|---|---|---|
| K = 0 | A4 = −5.60E−05 | A6 = 8.69E−08 | A8 = −6.89E−10 |

Various Pieces of Data
Zoom Ratio 2.90

| | Wide Angle | Intermediate | Telephoto |
|---|---|---|---|
| Focal Length | 18.414 | 31.496 | 53.399 |
| F Number | 3.56 | 5.02 | 5.61 |
| Semi-Angle of View(°) | 39.24 | 24.71 | 14.89 |
| Image Height | 14.250 | 14.250 | 14.250 |
| Entire Length of Lens | 103.000 | 103.000 | 103.000 |
| BF(in air) | 22.569 | 22.569 | 22.569 |
| d9 | 30.694 | 15.431 | 1.200 |
| d11 | 5.916 | 3.726 | 3.473 |
| d14 | 2.544 | 1.705 | 5.161 |
| d17 | 2.261 | 20.554 | 31.581 |

Embodiment 4

Figure 13:
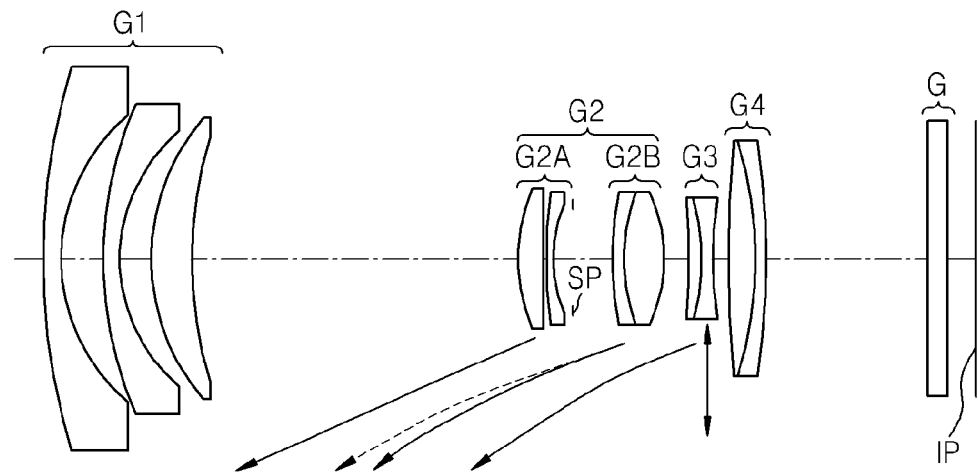
FIG. 13 is a cross-sectional view of a zoom lens at a wide angle end, according to a fourth exemplary embodiment.
Figure 14:
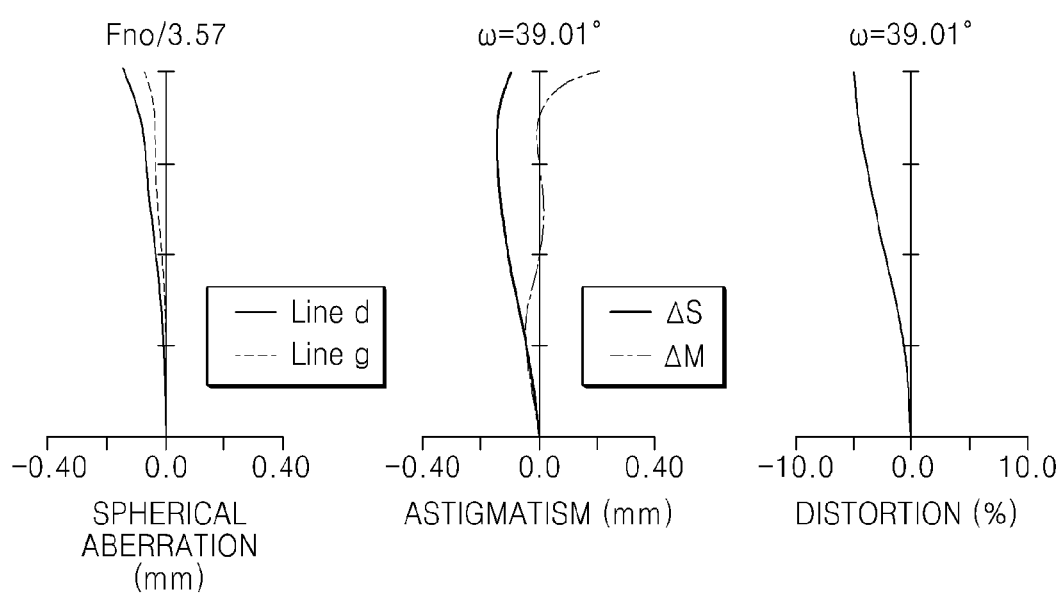
FIG. 14 is an aberration diagram of the zoom lens of FIG. 13 at the wide angle end.
Figure 15:
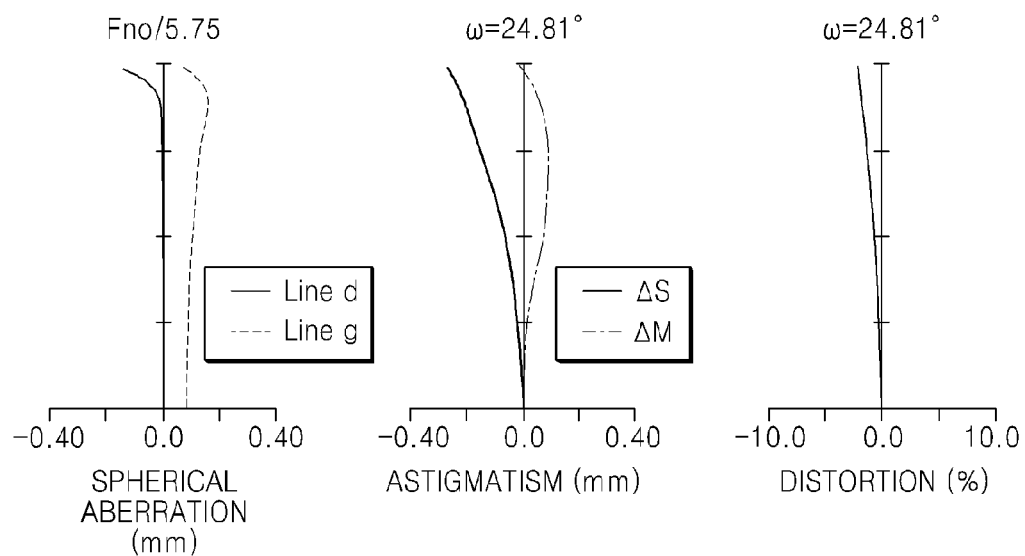
FIG. 15 is an aberration diagram of the zoom lens of FIG. 13 at an intermediate zoom position.
Figure 16:
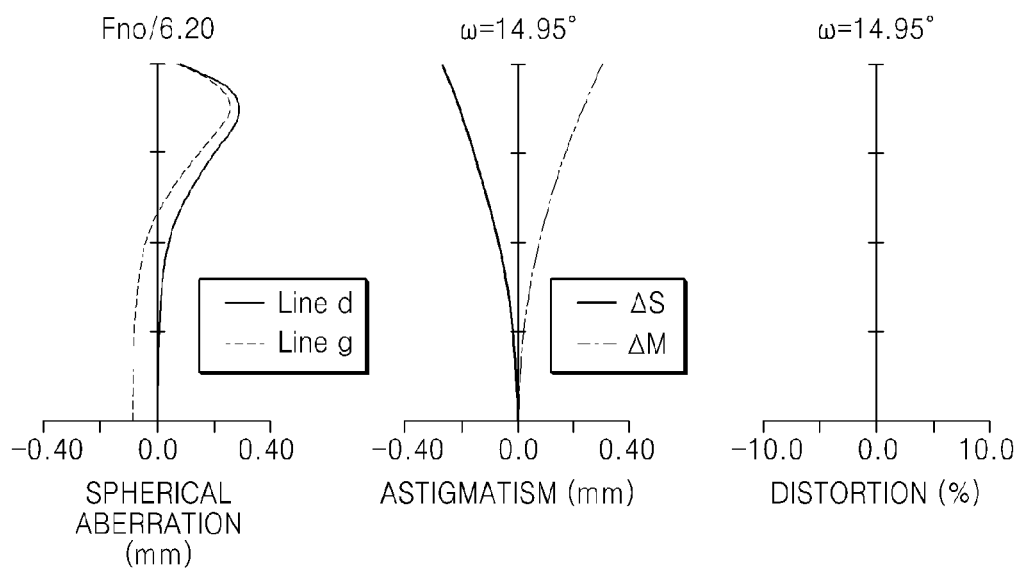
FIG. 16 is an aberration diagram of the zoom lens of FIG. 13 at a telephoto end.

Table 5 shows the lens data for Embodiment 4. In addition, FIG. 13 is a cross-sectional view of a zoom lens at a wide angle end, according to Embodiment 4. FIG. 14 is an aberration diagram of the zoom lens at the wide angle end, according to Embodiment 4. FIG. 15 is an aberration diagram of the zoom lens at an intermediate zoom position, according to Embodiment 4. FIG. 16 is an aberration diagram of the zoom lens at a telephoto end, according to Embodiment 4.

TABLE 5

[Numerical Embodiment 4]

Surface Data

| Surface No. | r | d | nd | vd |
|---|---|---|---|---|
| Object Surface | ∞ | ∞ | | |
| 1 | 69.807 | 1.741 | 1.65160 | 58.55 |
| 2 | 20.535 | 5.229 | | |
| 3* | 180.653 | 1.200 | 1.58913 | 61.15 |
| 4* | 21.373 | 3.850 | | |
| 5 | 23.354 | 4.361 | 1.80610 | 33.27 |
| 6 | 51.084 | Variable | | |
| 7* | 17.479 | 2.671 | 1.68997 | 53.00 |
| 8* | −178.136 | 0.217 | | |
| 9 | 45.614 | 0.800 | 1.67270 | 32.17 |
| 10 | 17.479 | 2.300 | | |
| 11 (Aperture) | ∞ | Variable | | |
| 12* | 37.461 | 1.000 | 1.68475 | 31.22 |
| 13 | 17.174 | 4.447 | 1.49700 | 81.61 |
| 14 | −17.174 | Variable | | |
| 15 | −183.982 | 1.500 | 1.84666 | 23.78 |
| 16 | −25.145 | 1.000 | 1.80611 | 40.73 |
| 17 | 26.071 | Variable | | |
| 18 | 177.742 | 2.939 | 1.72916 | 54.67 |

TABLE 5-continued

[Numerical Embodiment 4]

| | | | | |
|---|---|---|---|---|
| 19 | −43.187 | 1.000 | 1.69895 | 30.05 |
| 20 | −117.359 | 18.000 | | |
| 21 | ∞ | 2.000 | 1.51680 | 64.20 |
| 22 | ∞ | 3.200 | | |
| Upper Surface | ∞ | | | |

Aspherical Surface Data

3rd Surface $K = 0$  $A4 = 5.97E−05$  $A6 = −1.56E−07$  $A8 = 2.38E−10$  $A10 = −1.89E−13$

4th Surface $K = 0$  $A4 = 5.90E−05$  $A6 = −7.57E−08$  $A8 = −1.86E−10$  $A10 = 6.77E−14$

7th Surface $K = 0$  $A4 = 3.51E−05$  $A6 = 1.65E−07$  $A8 = −2.07E−09$

8th Surface $K = 0$  $A4 = −8.56E−08$  $A6 = 4.47E−07$  $A8 = −4.14E−09$

12th Surface $K = 0$  $A4 = −3.86E−05$  $A6 = 1.82E−07$  $A8 = −1.47E−08$

Various Pieces of Data
Zoom Ratio 2.88

| | Wide Angle | Intermediate | Telephoto |
|---|---|---|---|
| Focal Length | 18.550 | 31.497 | 53.400 |
| F number | 3.57 | 5.75 | 6.20 |
| Semi-Angle of View(°) | 39.01 | 24.81 | 14.95 |
| Image Height | 14.250 | 14.250 | 14.250 |
| Entire Length of Image | 103.000 | 103.000 | 103.000 |
| BF (in air) | 22.519 | 22.519 | 22.519 |
| d6 | 36.304 | 18.697 | 1.200 |
| d11 | 4.477 | 2.914 | 3.740 |
| d14 | 2.822 | 1.500 | 3.300 |
| d17 | 1.942 | 22.434 | 37.305 |

Embodiment 5

Figure 17:
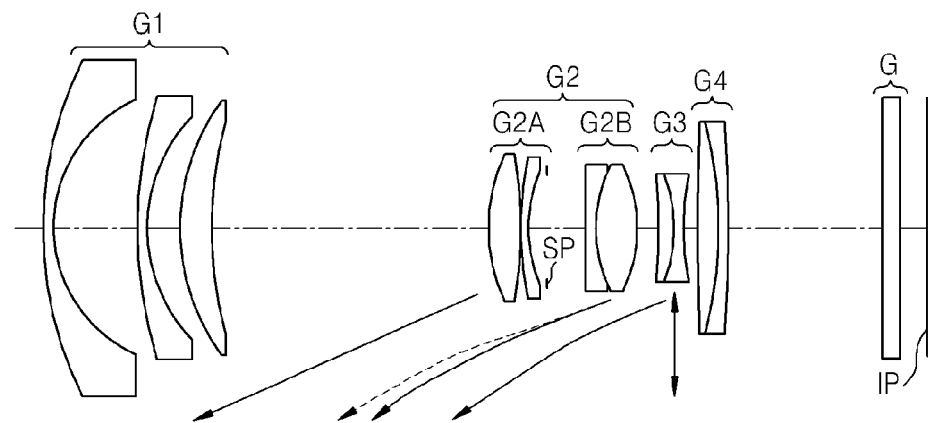
FIG. 17 is a cross-sectional view of a zoom lens at a wide angle end, according to a fifth exemplary embodiment.
Figure 18:
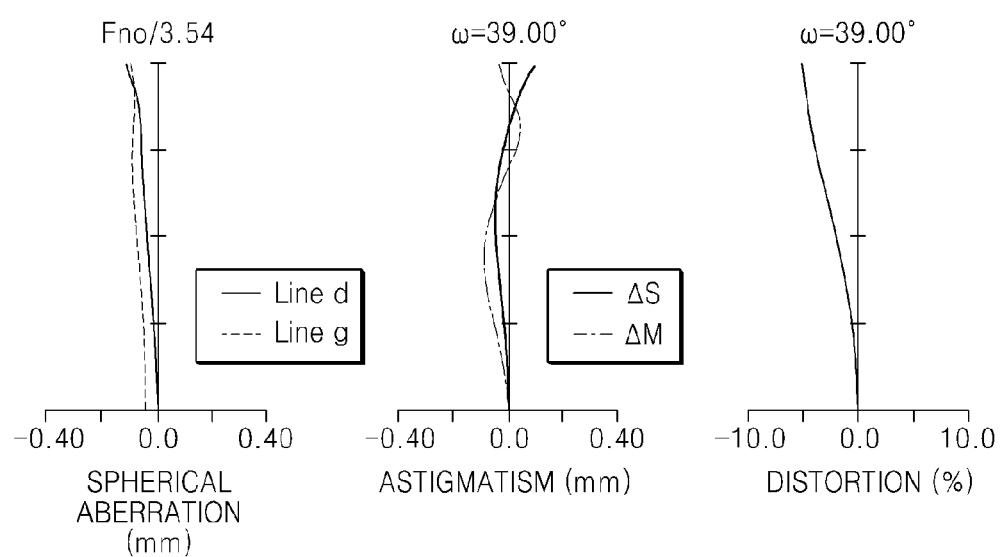
FIG. 18 is an aberration diagram of the zoom lens of FIG. 17 at the wide angle end.
Figure 19:
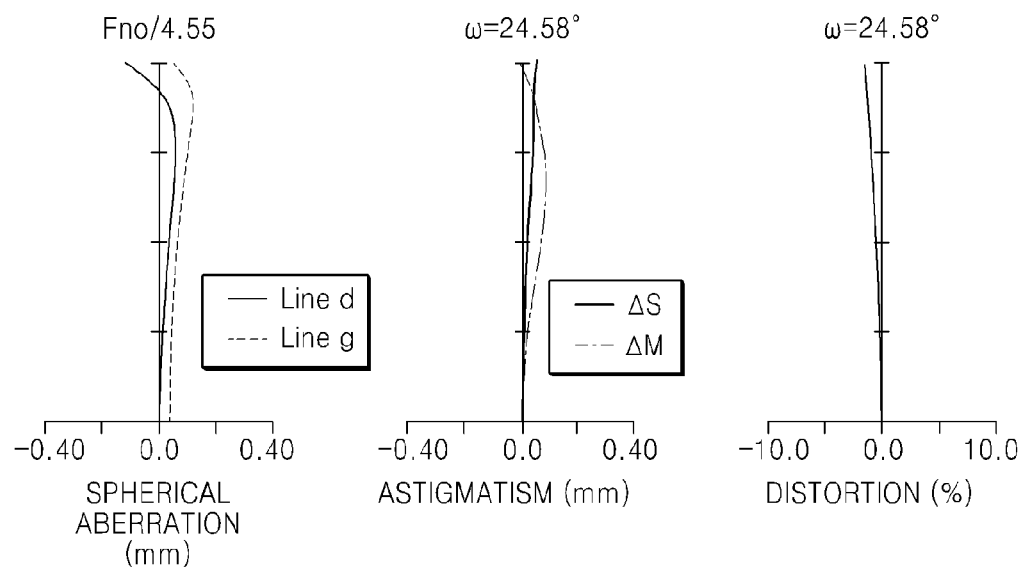
FIG. 19 is an aberration diagram of the zoom lens of FIG. 17 at an intermediate zoom position.
Figure 20:
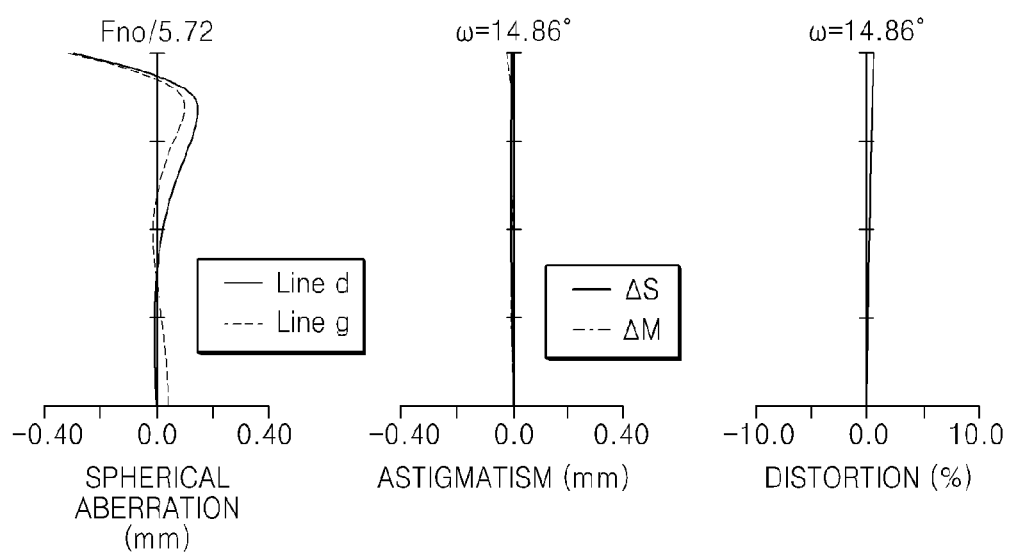
FIG. 20 is an aberration diagram of the zoom lens of FIG. 17 at a telephoto end.

Table 6 shows the lens data for Embodiment 5. In addition, FIG. 17 is a cross-sectional view of a zoom lens at a wide angle end, according to Embodiment 5. FIG. 18 is an aberration diagram of the zoom lens at the wide angle end, according to Embodiment 5. FIG. 19 is an aberration diagram of the zoom lens at an intermediate zoom position, according to Embodiment 5. FIG. 20 is an aberration diagram of the zoom lens at a telephoto end, according to Embodiment 5.

TABLE 6

[Numerical Embodiment 5]

Surface Data

| Surface No. | r | d | nd | vd |
|---|---|---|---|---|
| Object Surface | ∞ | ∞ | | |
| 1 | 42.748 | 1.200 | 1.72916 | 54.67 |
| 2 | 16.379 | 9.667 | | |
| 3* | 410.696 | 1.200 | 1.58313 | 59.39 |
| 4* | 22.268 | 3.910 | | |
| 5 | 24.505 | 3.634 | 1.80610 | 33.23 |
| 6 | 54.109 | Variable | | |
| 7* | 17.762 | 3.634 | 1.69350 | 53.19 |
| 8* | −70.577 | 0.150 | | |
| 9 | 34.349 | 0.800 | 1.68893 | 31.08 |
| 10 | 18.713 | 2.300 | | |

TABLE 6-continued

[Numerical Embodiment 5]

| | | | | |
|---|---|---|---|---|
| 11 (Aperture) | ∞ | Variable | | |
| 12* | 112.977 | 1.000 | 1.68893 | 31.08 |
| 13 | 15.224 | 5.000 | 1.49700 | 81.61 |
| 14 | −15.224 | Variable | | |
| 15 | −92.748 | 1.845 | 1.84666 | 23.78 |
| 16 | −17.079 | 1.000 | 1.80611 | 40.73 |
| 17 | 28.658 | Variable | | |
| 18 | 599.698 | 2.323 | 1.72916 | 54.68 |
| 19 | −51.416 | 1.000 | 1.80000 | 29.84 |
| 20 | −207.675 | 18.000 | | |
| 21 | ∞ | 2.000 | 1.51680 | 64.20 |
| 22 | ∞ | 3.200 | | |
| Upper Surface | ∞ | | | |

Aspherical Surface Data

3rd Surface $K = 0$  $A4 = 5.92E−05$  $A6 = −1.71E−07$  $A8 = 3.83E−10$

4th Surface $K = 0$  $A4 = 5.31E−05$  $A6 = −1.29E−07$  $A8 = 3.55E−11$

7th Surface $K = 0$  $A4 = −3.23E−05$  $A6 = 2.98E−08$  $A8 = 2.34E−10$

TABLE 6-continued

[Numerical Embodiment 5]

8th Surface

| | | | |
|---|---|---|---|
| K = 0 | A4 = −4.14E−06 | A6 = 2.42E−07 | A8 = −8.37E−10 |

12th Surface

| | | | |
|---|---|---|---|
| K = 0 | A4 = −6.40E−05 | A6 = 1.83E−07 | A8 = −1.55E−09 |

Various Pieces of Data
Zoom Ratio 2.88

| | Wide Angle | Intermediate | Telephoto |
|---|---|---|---|
| Focal Length | 18.550 | 31.497 | 53.400 |
| F number | 3.54 | 4.55 | 5.72 |
| Semi-Angle of View(°) | 39.00 | 24.58 | 14.86 |
| Image Height | 14.250 | 14.250 | 14.250 |
| Entire Length of Lens | 103.000 | 103.000 | 103.000 |
| BF(in air) | 22.519 | 22.519 | 22.519 |
| d6 | 32.393 | 16.516 | 1.200 |
| d11 | 4.492 | 3.046 | 3.427 |
| d14 | 2.414 | 1.500 | 3.606 |
| d17 | 1.837 | 20.075 | 32.903 |

In the above zoom lenses according to the embodiments, a satisfactory performance can be maintained and the miniaturization of the zoom lenses can be realized at the time of a change in variable zoom, focusing, and a shift of an image, by appropriately configuring each lens group.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments have been described with reference to the figures, it will be understood by those of ordinary skill in the art that various changes in form and details may be made therein without departing from the spirit and scope of the invention as defined by the following claims.

What is claimed is:

1. A zoom lens comprising, sequentially from an object side:
   a first lens group having a negative refractive power;
   a second lens group having a positive refractive power;
   a third lens group having a negative refractive power; and
   a fourth lens group having a positive refractive power,
   wherein, when zoom is varied from a wide angle end to a telephoto end, positions of the first lens group and the fourth lens group are fixed with respect to an optical axis,
   wherein the second lens group comprises, sequentially from the object side, a second A lens group having a positive refractive power and a second B lens group having a positive refractive power, and the second B lens group is moved along the optical axis to perform a focusing function from an object that is disposed in a close range to an object that is disposed at infinity,
   wherein the third lens group is shifted in a direction perpendicular to the optical axis to correct image blur,
   wherein the first lens group comprises, sequentially from the object side:
      two negative lenses, each negative lens having a convex surface facing the object side; and
      a positive lens having a convex surface facing the object side, and wherein the zoom lens satisfies the following condition:

$$0.3 < |f1/ft| < 1.0,$$

wherein "f1" denotes a focal length of the first lens group, and "ft" denotes a focal length of the zoom lens at the telephoto end.

2. The zoom lens of claim 1, wherein the zoom lens further satisfies the following condition:

$$0.5 < |f1/ft| < 0.8.$$

3. The zoom lens of claim 1, wherein, when zoom is varied from the wide angle end to the telephoto end, the second lens group and the third lens group are moved along the optical axis to change an interval between the first lens group and the second A lens group, an interval between the second A lens group and the second B lens group, an interval between the second B lens group and the third lens group, and an interval between the third lens group and the fourth lens group.

4. An electronic device comprising:
   the zoom lens of claim 1; and
   an imaging element that converts an optical image signal transmitted by the zoom lens into an electrical image signal.

5. A camera comprising:
   a housing;
   the zoom lens of claim 1 that is configured as an interchangeable lens and is configured to detachably couple to the housing; and
   an imaging element disposed in the housing and converts an optical image signal transmitted by the zoom lens into an electrical image signal.

6. A zoom lens comprising, sequentially from an object side:
   a first lens group having a negative refractive power;
   a second lens group having a positive refractive power;
   a third lens group having a negative refractive power; and
   a fourth lens group having a positive refractive power,
   wherein, when zoom is varied from a wide angle end to a telephoto end, positions of the first lens group and the fourth lens group are fixed with respect to an optical axis,
   wherein the second lens group comprises, sequentially from the object side, a second A lens group having a positive refractive power and a second B lens group having a positive refractive power, and the second B lens group is moved along the optical axis to perform a focusing function from an object that is disposed in a close range to an object that is disposed at infinity,
   wherein the third lens group is shifted in a direction perpendicular to the optical axis to correct image blur,
   wherein:
      the second A lens group comprises at least one aspherical surface, at least one positive lens, and at least one negative lens;
      the second B lens group comprises, sequentially from the object side, a negative lens and a positive lens; and
      the zoom lens satisfies the following conditions:

$0.3 < f2B/ft < 1.0$, and $0.3 < f2A/ft < 1.2$, wherein "f2A" denotes a focal length of the second A lens group, which has a positive refractive power and is disposed on the object side in the second lens group, "f2B" denotes a focal length of the second B lens group, which has a positive refractive power and is disposed on an image side in the second lens group, and "ft" denotes a focal length of the zoom lens at the telephoto end.

7. The zoom lens of claim 6, wherein the zoom lens further satisfies the following conditions:

$0.5 < f2B/ft < 0.8$, and $0.5 < f2A/ft < 0.9$.

8. The zoom lens of claim 6, wherein the second A lens group comprises:
   a positive lens having a convex surface facing the object side; and
   a negative lens having a concave surface facing the image side.

9. The zoom lens of claim 6, wherein the negative lens and the positive lens of the second B lens group are bonded to each other to form a cemented lens.

10. An electronic device comprising:
    the zoom lens of claim 6; and
    an imaging element that converts an optical image signal transmitted by the zoom lens into an electrical image signal.

11. A zoom lens comprising, sequentially from an object side:
    a first lens group having a negative refractive power;
    a second lens group having a positive refractive power;
    a third lens group having a negative refractive power; and
    a fourth lens group having a positive refractive power,
    wherein, when zoom is varied from a wide angle end to a telephoto end, positions of the first lens group and the fourth lens group are fixed with respect to an optical axis,
    wherein the second lens group comprises, sequentially from the object side, a second A lens group having a positive refractive power and a second B lens group having a positive refractive power, and the second B lens group is moved along the optical axis to perform a focusing function from an object that is disposed in a close range to an object that is disposed at infinity,
    wherein the third lens group is shifted in a direction perpendicular to the optical axis to correct image blur,
    wherein:
       the third lens group comprises, sequentially from the object side, at least one positive lens and at least one negative lens; and
       the zoom lens satisfies the following condition:

$0.3 < |f3/ft| < 1.2$, wherein "f3" denotes a focal length of the third lens group, and "ft" denotes a focal length of the zoom lens at the telephoto end.

12. The zoom lens of claim 11, wherein the zoom lens further satisfies the following condition:

$0.5 < |f3/ft| < 0.9$.

13. The zoom lens of claim 11, wherein the at least one negative lens and the at least one positive lens of the third lens group are bonded to each other to form a cemented lens.

14. The zoom lens of claim 11, wherein the positive lens of the third lens group is a meniscus lens that is concave toward the object side.

15. An electronic device comprising:
    the zoom lens of claim 11; and
    an imaging element that converts an optical image signal transmitted by the zoom lens into an electrical image signal.

16. A zoom lens comprising, sequentially from an object side:
    a first lens group having a negative refractive power;
    a second lens group having a positive refractive power;
    a third lens group having a negative refractive power; and
    a fourth lens group having a positive refractive power,
    wherein, when zoom is varied from a wide angle end to a telephoto end, positions of the first lens group and the fourth lens group are fixed with respect to an optical axis,
    wherein the second lens group comprises, sequentially from the object side, a second A lens group having a positive refractive power and a second B lens group having a positive refractive power, and the second B lens group is moved along the optical axis to perform a focusing function from an object that is disposed in a close range to an object that is disposed at infinity,
    wherein the third lens group is shifted in a direction perpendicular to the optical axis to correct image blur, wherein:
the fourth lens group comprises, sequentially from the object side, a positive lens and a negative lens; and
the zoom lens satisfied the following condition:

$$1.5 < f4/ft < 15,$$

wherein "f4" denotes a focal length of the fourth lens group, and "ft" denotes a focal length of the zoom lens at the telephoto end.

17. The zoom lens of claim 16, wherein the zoom lens further satisfies the following condition:

$$1.7 < f4/ft < 15.$$

18. The zoom lens of claim 16, wherein the negative lens and the positive lens of the fourth lens group are bonded to each other to form a cemented lens.

19. An electronic device comprising:
the zoom lens of claim 12; and
an imaging element that converts an optical image signal transmitted by the zoom lens into an electrical image signal.

* * * * *